United States Patent [19]
Lee

[11] Patent Number: 5,836,218
[45] Date of Patent: Nov. 17, 1998

[54] CRANKSHAFT FOR COOLING PISTONS

[75] Inventor: Hyun-Gi Lee, Kyungsangnam-do, Rep. of Korea

[73] Assignee: Hyundai Motor Company, Ltd., Seoul, Rep. of Korea

[21] Appl. No.: 771,422

[22] Filed: Dec. 20, 1996

[30] Foreign Application Priority Data

Dec. 20, 1995 [KR] Rep. of Korea .................. 1995 52774

[51] Int. Cl.⁶ .............................. F16C 3/04; F16C 11/00
[52] U.S. Cl. .................... 74/605; 74/603; 74/535
[58] Field of Search ............................. 74/603, 605, 595

[56] References Cited

U.S. PATENT DOCUMENTS

| | | | |
|---|---|---|---|
| 1,511,200 | 10/1924 | Jerome | 74/605 |
| 1,618,870 | 2/1927 | Fedden et al. | 74/605 |
| 1,874,444 | 8/1932 | Carvelli | 74/605 |
| 2,196,422 | 4/1940 | Meyer | 74/605 |
| 2,289,124 | 7/1942 | Karey | 74/605 |
| 2,419,408 | 4/1947 | Lightowler | 74/605 |
| 2,440,812 | 5/1948 | Simpson | 74/605 |
| 2,917,946 | 12/1959 | Fritz | 74/605 |
| 3,621,733 | 11/1971 | Seulen et al. | 74/605 |
| 3,673,651 | 7/1972 | Stewart | 74/603 |
| 3,768,335 | 10/1973 | Mayer | 74/605 |
| 4,015,485 | 4/1977 | Ganter-Ullmann et al. | 74/596 |
| 4,622,864 | 11/1986 | Fetouh | 74/605 X |
| 4,768,397 | 9/1988 | Adams | 74/603 |
| 4,881,427 | 11/1989 | Yasutake | 74/603 |
| 4,969,430 | 11/1990 | Masuda | 74/603 X |
| 5,152,373 | 10/1992 | Callies | 74/605 |
| 5,163,341 | 11/1992 | Murrish et al. | 74/595 |
| 5,461,940 | 10/1995 | Morita | 74/603 |

FOREIGN PATENT DOCUMENTS 409290  2/1945  Italy .......................... 74/605

*Primary Examiner*—Vinh T. Luong
*Attorney, Agent, or Firm*—Birch, Stewart, Kolasch & Birch, LLP

[57] ABSTRACT

A crankshaft for cooling pistons having oil passages which are respectively terminated at three weight balances have a couple of oil holes, so that the oil holes at the weight balances are equipped with oil jets and inject the oil toward each piston of the engine.

6 Claims, 2 Drawing Sheets

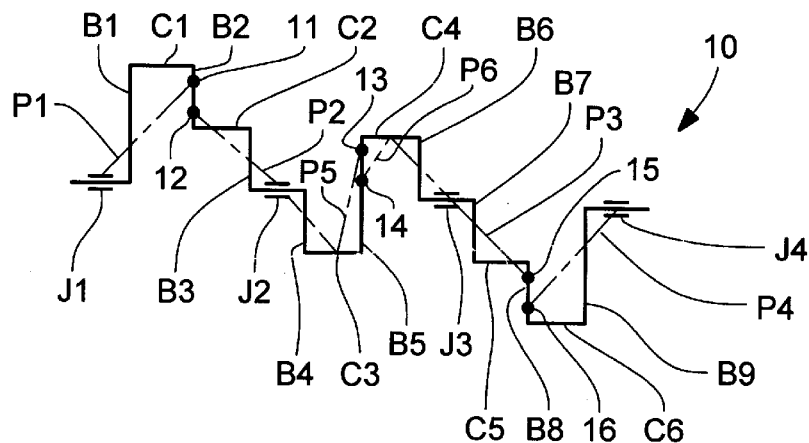
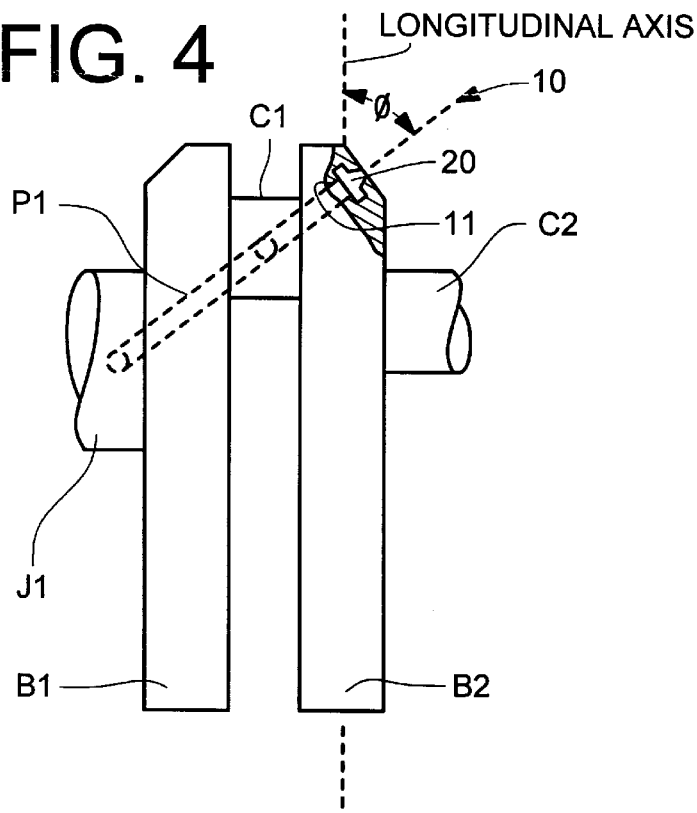
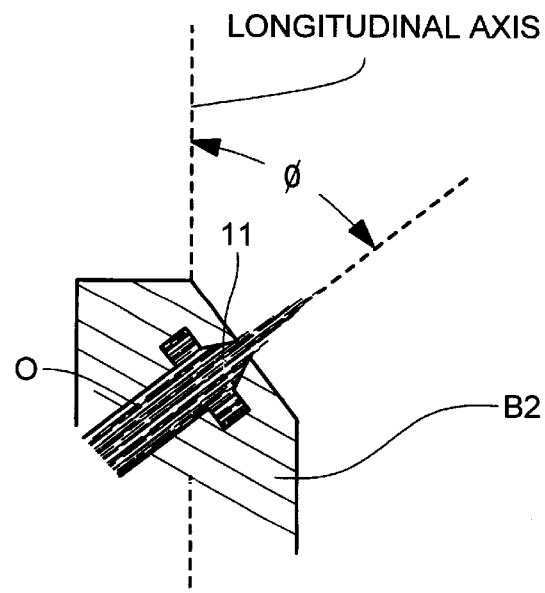

CRANKSHAFT FOR COOLING PISTONS

BACKGROUND OF THE INVENTION

1. Field of the Invention

This invention relates generally to a crankshaft of an automobile engine.

In particular, it relates to a cooling device for cylinders and pistons using oil passages of a crankshaft.

2. Description of the Prior Art

A crankshaft, as partially shown in FIG. 1, has an oil passage P1 extending from a journal bearing J1 to a crank pin C1 through balance weights B1 and B2 for lubricating a bearing of a connecting rod coupled around the crankshaft.

All of four oil passages for a general V6 type of crankshaft are schematically shown in FIG. 2 as a line diagram.

In FIG. 2, the horizontal lines are journal bearings J1–J4 or crank pins C1–C6 around which connecting rods (not shown) are joined. The vertical lines indicate balance weights B1–B9. Oil passages P1–P4 starting from every journal J1–J4 penetrate through the crankshaft into the second through the eighth balance weights B2–B8. Furthermore, each end of the oil passages P1–P4 in the balance weights B2–B8 are caulked with a ball 1. The oil, which is pumped through journals J1–J4, is discharged from the openings (2, FIG. 1) and lubricates bearings between the crankshaft and connecting rods.

Meanwhile, pistons which are located in cylinders over the crankshaft are cooled by oil which is scattered by connecting rods in a crank case. The cooling effect of the scattered oil, however, is relatively low.

It is an object of the present invention to provide a crankshaft for cooling pistons using its oil passages.

SUMMARY OF THE INVENTION

An object of the present invention is, therefore, to provide a crankshaft for cooling pistons by injecting oil towards the pistons through oil passages disposed in crank pins, balance weights, and journals, and oil holes disposed in the balance weights and crank pins.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

For fuller understanding of the nature and objects of the invention, reference should be made to the following detailed description taken in conjunction with the accompanying drawings which are given by way of illustration only, and thus are not limitive of the present invention, and wherein:

FIG. 3 is a line diagram showing oil passages of a V-6 crankshaft according to the invention;

FIG. 4 is a front view of a part of a crankshaft having an oil jet at end opening of an oil passage according to the invention; and FIG. 4A is an enlarged cross-sectional view of an oil jet in a balance weight.

DETAILED DESCRIPTION OF THE INVENTION

Figure 1:
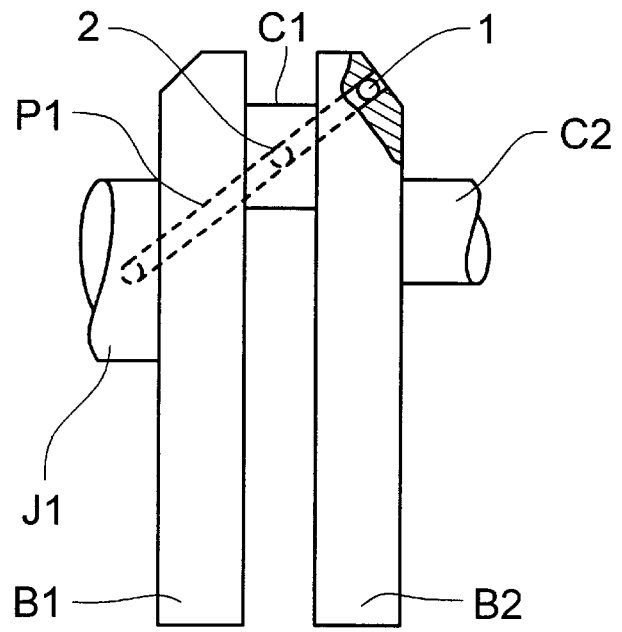
FIG. 1 is a front view of a part of a crankshaft according to the prior art.
Figure 2:
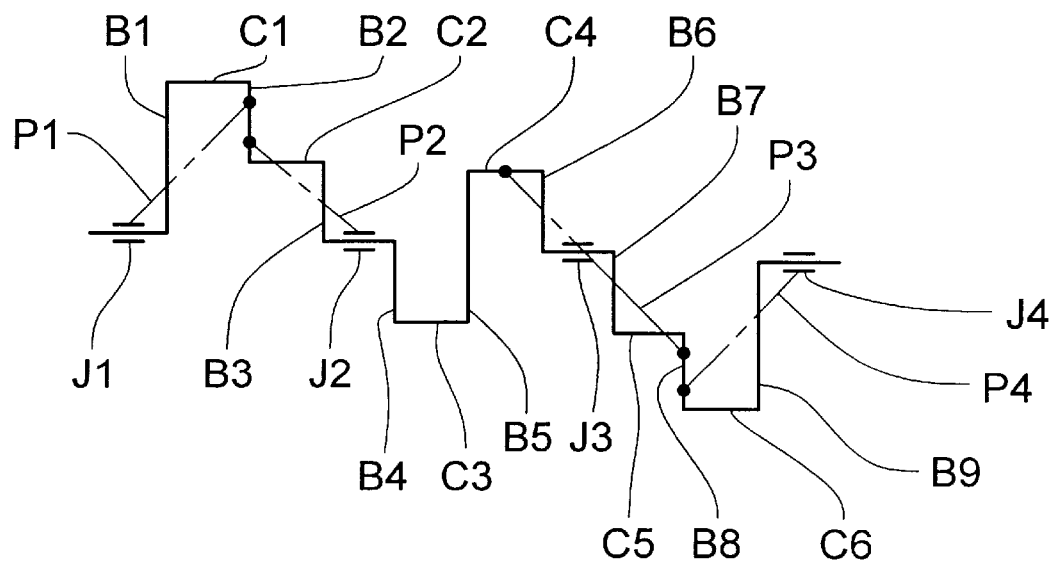
FIG. 2 is a line diagram showing overall oil passages of a V-6 crankshaft of the prior art.

FIG. 3 is a schematic line diagram showing oil passages of a V-6 crankshaft according to the invention.

Referring to FIG. 3, the crankshaft 10 of the invention has two additional oil passages P5 and P6 including former oil passages P1–P4. Further, newly added fifth oil passage P5 is formed between a third crank pin C3 and a fifth balance weight B5 extending from the second oil passage P2. And the sixth oil passage P6 is formed between a fourth crank pin C4 and the fifth balance weight B5 extending from the third oil passage P3 to a point beneath the fifth oil passage P5. Therefore, end openings of the two oil passages P5 and P6 form oil holes 13 and 14 which are oppositely located in the fifth balance weight B5.

Meanwhile, former oil holes 11, 12, 15 and 16 are located such that the first oil hole 11 at the second balance weight B2 faces toward the second piston, the second oil hole 12 faces toward the first piston, and oil holes 15 and 16 at the eighth balance weight B8 face toward the fifth and sixth piston, respectively. Further, the newly formed third and fourth oil holes 13 and 14 are disposed toward the third and fourth piston, respectively.

As described above, the oil passages P1–P6 of the crankshaft 10 have six oil holes 11–16 formed as couples 11 and 12, 13 and 14, and 15 and 16 at the second, fifth and eighth balance weights B2, B5 and B8 respectively and each couple of oil holes at a balance weight are open to an opposite direction with respect to each other at the balance weight. Each oil hole 11–16 faces toward one of the six pistons (not shown).

The detailed structure of an oil hole 11 of the balance weight B1 and B2 is illustrated in FIG. 4 as an example. The other oil holes 12–16 are similar in structure thereof to the illustrated one. The first oil passage P1 is started from the first journal J1 and passes through the first weight balance weight B1 and the first crank pin C1 and terminates at the second weight balance B2 which has an oil hole 11 open at its right side.

An oil jet 20 is inserted in the oil hole 11 of the oil passage P1 instead of a ball of the prior art. Though not shown, the second oil hole 12 is also formed at the second weight balance B2 and is opened oppositely relative to the oil hole 11 at the left side. The oil jet 20 of the oil holes 11–16 is constructed in the same way at all the end openings of the oil passages P1–P6 and injects oil, which is provided through the oil passages P1–P6, toward the pistons, so that the injected oil cools the pistons as well as cylinders.

Accordingly, the present invention adds new oil passages P5–P6 in the crankshaft 10 and inserts oil jets at the oil holes 11–16, so that the crankshaft 10 can lubricate the bearings through openings of the crank pins and can also cool the pistons and cylinders by the oil jets at the same time.

Therefore, the pistons can be cooled effectively by the oil injected from the crankshaft.

Numerous modifications and variations of the present invention are possible in light of the above teachings.

For example, though the invention is described for a crankshaft of V-6 engine, the teachings can be applied to other type of crankshafts, and the oil passages may be modified according to the configurations of the crankshafts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A crankshaft system comprising:

a plurality of crank pins connected together by a plurality of balance weights;

journal means rotatably supporting said crank pins and said balance weights;

oil passage means for providing passages in said crank pins, said balance weights, and said journal means, whereby each balance weight has at least one oil passage means disposed therein; and oil hole means being disposed in said balance weights and said crank pins for providing an equal distribution of oil, said oil hole means further comprises oil lets for providing high-velocity streams of oil to further widen said distribution of oil.

2. The crankshaft system of claim 1, wherein said oil hole means comprises at least two oil holes disposed in at least one balance weight of said balance weights to further widen said distribution of oil.

3. The crankshaft system according to claim 2, wherein said oil holes face in opposite directions relative to each other to further widen said distribution of oil.

4. The crankshaft system according to claim 2, wherein said balance weights each comprise a longitudinal axis and said oil holes are disposed at angles relative to said axis to further widen said distribution of oil.

5. The crankshaft system of claim 1, wherein said oil hole means comprises oil holes facing in opposite directions relative to each other to further widen said distribution of oil.

6. The crankshaft system of claim 1, wherein said balance weights each comprise a longitudinal axis and said oil hole means are disposed at angles relative to said axis to further widen said distribution of oil.

* * * * *

UNITED STATES PATENT AND TRADEMARK OFFICE
CERTIFICATE OF CORRECTION

PATENT NO.: 5,936,218
DATED : August 10, 1999
INVENTOR(S): Masanori OHKAWA et al.

It is certified that error appears in the above-identified patent and that said Letters Patent is hereby corrected as shown below:

Col. 37, line 14, begin a new paragraph with "the axis".

Col. 38, line 5, delete "and";
line 8, begin a new paragraph with "the axis".

Signed and Sealed this

First Day of February, 2000

Attest:

Attesting Officer

Q. TODD DICKINSON

Acting Commissioner of Patents and Trademarks